July 21, 1959    M. L. BAXTER, JR., ET AL    2,895,384
MACHINE FOR CUTTING GEARS AND THE LIKE
Filed June 15, 1954     4 Sheets-Sheet 1

FIG. I

INVENTORS
MERIWETHER L. BAXTER, JR.
LEONARD O. CARLSEN
BY
*ATTORNEY*

July 21, 1959   M. L. BAXTER, JR., ET AL   2,895,384
MACHINE FOR CUTTING GEARS AND THE LIKE
Filed June 15, 1954   4 Sheets—Sheet 4

INVENTORS
MERIWETHER L. BAXTER, JR.
LEONARD O. CARLSEN
BY Richard W. Treverton
ATTORNEY

United States Patent Office 2,895,384
Patented July 21, 1959

2,895,384

MACHINE FOR CUTTING GEARS AND THE LIKE

Meriwether L. Baxter, Jr., Brighton, and Leonard O. Carlsen, Rochester, N.Y., assignors to The Gleason Works, Rochester, N.Y., a corporation of New York Application June 15, 1954, Serial No. 436,824

20 Claims. (Cl. 90—6)

The present invention relates to tooth cutting machines having one or more reciprocating tools, such for example as machines for cutting straight bevel gears and face couplings.

In such machines it is necessary to have a mechanism withdraw the tool from contact with the work during its return or idle stroke. In many cases it is also desirable during the cutting stroke to effect a slight depthwise motion, of the tool relative to the tooth surface being cut, to slightly crown the tooth and thereby localize the bearing or area of contact which the tooth has with a mating tooth. For this purpose mechanisms have heretofore been provided to move a reciprocating tool out and in, in a direction perpendicular to the cutting motion of the tool, as the tool moves respectively toward and away from the center of its cutting stroke.

According to the present invention both of these mechanisms are replaced by a means which causes the tool to swing in a substantially elliptical orbit, the arrangement being such that the tool moves in the direction of the major diameter of the orbit when at approximately the mid-points of its cutting and return strokes. The minor diameter of the orbit is of such length that the tool is withdrawn from the tooth space being cut during the return or idle stroke. The tooth side cutting edge of the tool is preferably inclined with respect to the plane of the orbit so that during the cutting stroke it describes a curved cutting surface. Usually the sense or hand of this inclination is made such that the cutting surface is concave, so that the tooth surface will be crowned from end to end. However, if preferred, the side cutting edge of the tool may be disposed in the plane of the orbit, in which case the edge will describe a plane cutting surface and no lengthwise curvature of the tooth surface will be obtained. Because the orbit of the tool is a smooth, continuous curve, the tool can be operated at high speed. At the same time the elliptical nature of the curve permits the tool to move clear of the work very quickly after its cutting stroke ends, enabling the cutter to operate in close quarters, as for example when cutting bevel gears with front hubs.

An important objective of invention, as applied to a two-tool machine where one tool cuts during the idle or return stroke of the other tool, is the provision of means to effect the relief motion of the two tools in directions oppositely inclined to the plane of symmetry of the tools, so that the relief motion of each tool carries it away from the cutting path of the other tool and allows both tools to operate at the same time in the same tooth space. In fact the cutting paths of the two tools are preferably made to slightly overlap, which makes possible the finish cutting from the solid of high quality gears devoid of first and last tooth effect.

The preferred mechanism for effecting the desired substantially elliptical motion of the tool comprises a tool carrying arm fulcrumed to a support by means of a pivoted link, which permits the arm to move relative to the support in approximately the direction of the minor axis of the orbit; and a member rotating on the support and having an eccentric portion thereof rotatably connected to the arm at a point substantially closer to the fulcrum than is the cutting edge of the tool.

The foregoing and other objects and advantages of the invention will appear from the following description made with reference to the accompanying drawings, wherein:

Fig. 5 is a detail sectional view in the plane 5—5 of Fig. 3; and,

Figure 1:
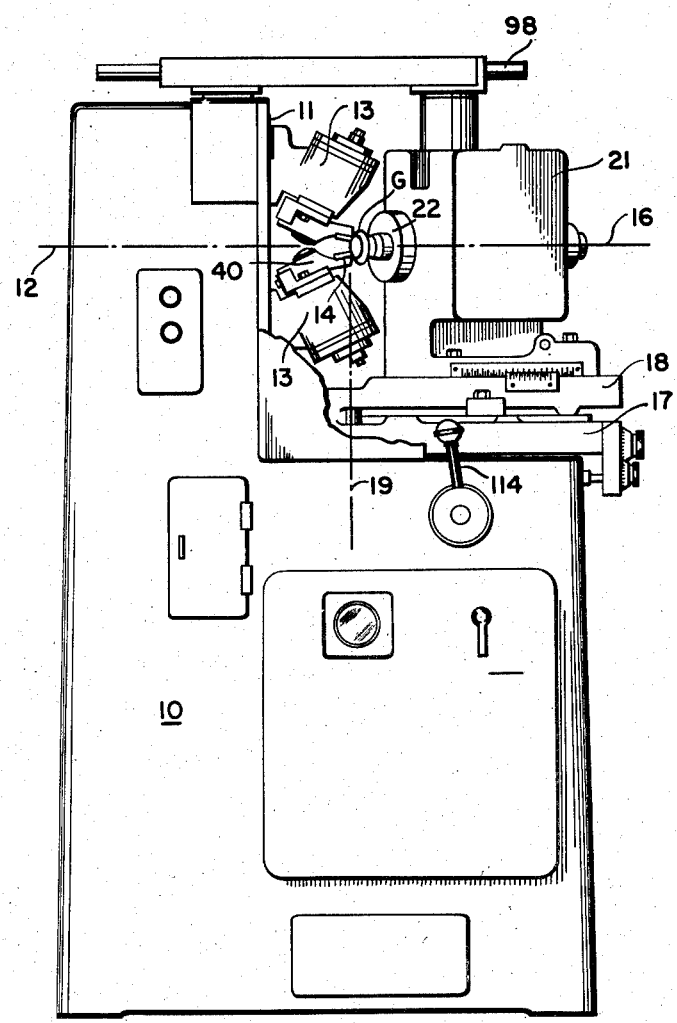
Fig. 1 is a front elevation of the entire machine.

In the drawings the invention is shown as applied to a machine for generating straight and skew bevel gears. The machine comprises a frame 10 on which a cradle 11 is mounted for rotation about a horizontal axis 12. Carried by the cradle are tool supports 13 for the cutting tools 14 which move in substantially elliptical orbits, their motion during the cutting stroke being primarily in directions radial of the axis 12 so that the cutting surfaces described by their side cutting edges 15 (Figs. 2, 3 and 4) will represent tooth surfaces of an imaginary generating gear whose axis is the cradle axis 12 and which runs in mesh with the work gear G rotating on horizontal axis 16. This axis intersects cradle axis 12 at an angle which depends upon the cone angle of the work gear.

The work support comprises a sliding base 17 which is adjustable and movable on the frame 10 in the direction of axis 12; a swinging base 18 which is adjustable on the sliding base about a vertical axis 19 which intersects the axis 12 at or near the intersection therewith of work axis 16 when the sliding base is in cutting position; a work head 21 which is adjustable on the swinging base 18 in a direction parallel to the work axis 16; and a spindle 22 which is rotatable in head 21 on axis 16. By the several adjustments referred to the work gear may be brought into the desired position for cutting by the tools 14.

Figure 2:
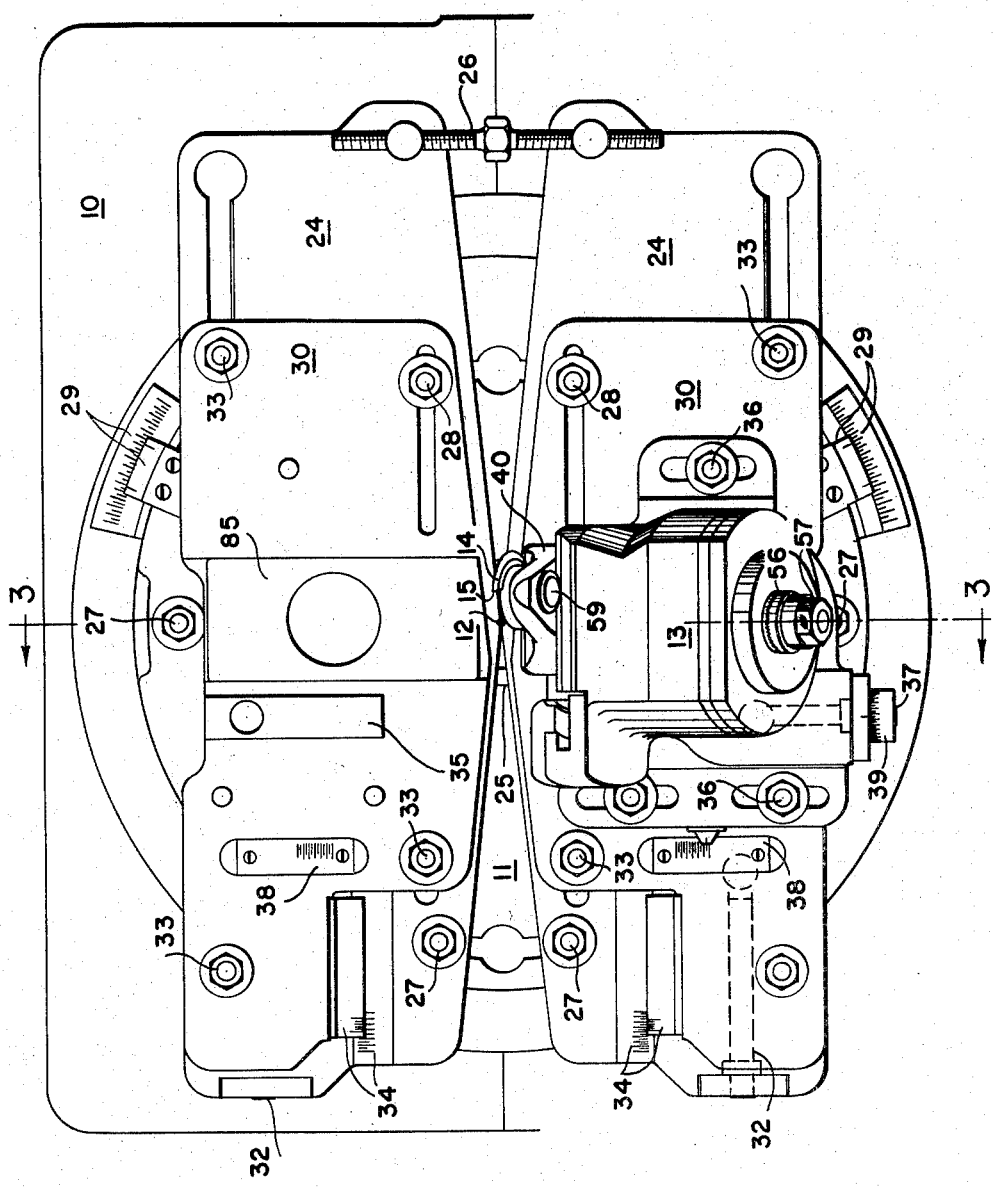
Fig. 2 is a fragmentary elevation, taken at right angles to Fig. 1, showing the cradle or tool supporting part of the machine with one tool and a part of its supporting mechanism removed.
Figure 3:
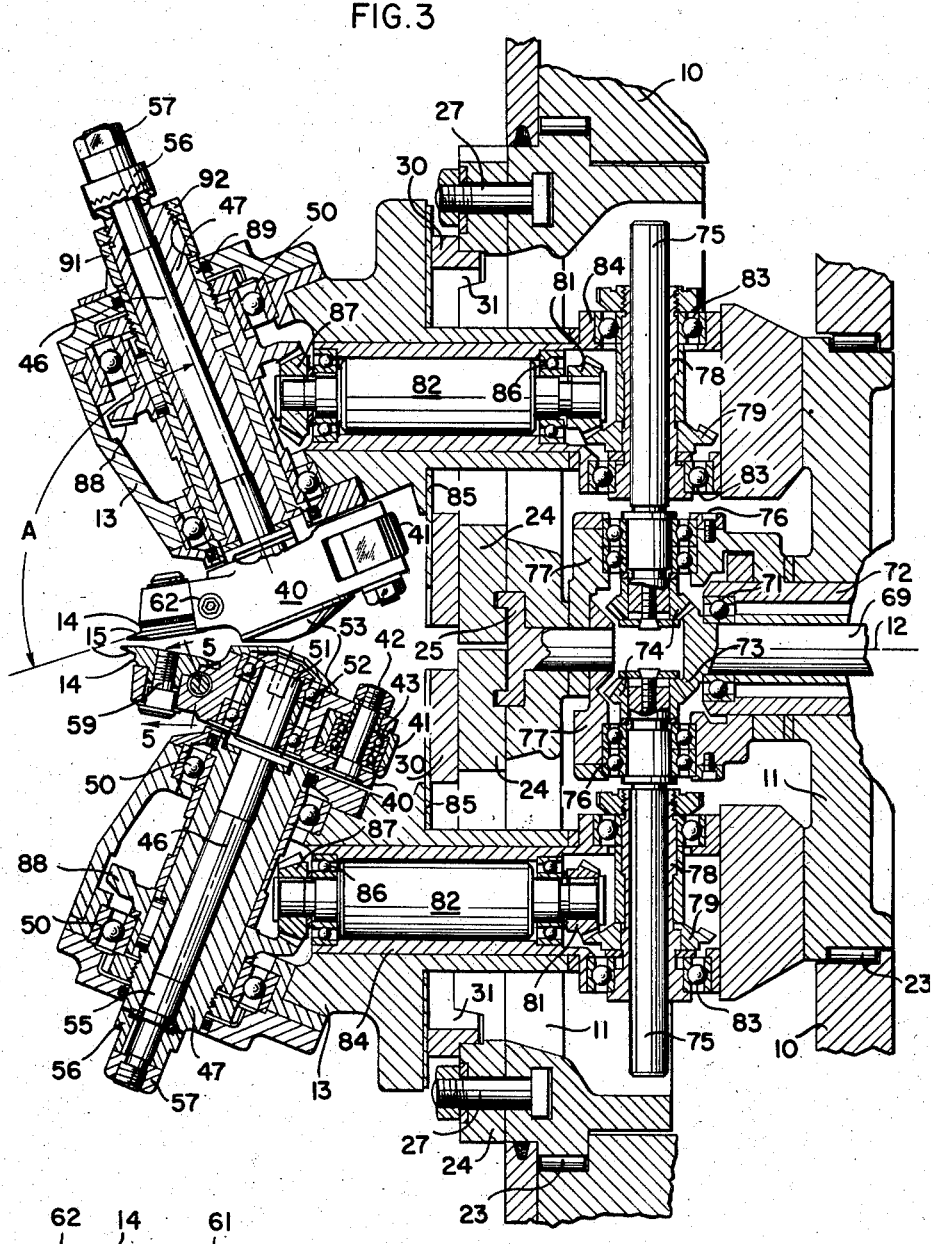
Fig. 3 is a vertical section taken in the plane designated 3—3 in Fig. 2.
Figure 4:
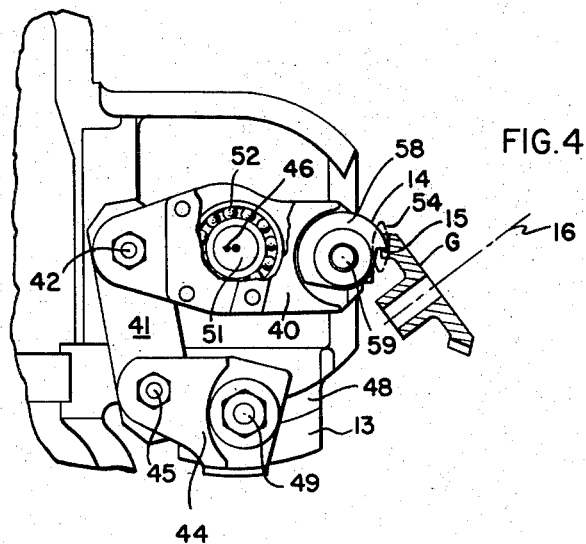
Fig. 4 is a fragmentary view showing one tool and its supporting linkage, the view being in the plane of the orbital motion of the tool.

Referring now in greater detail to the tool supporting and operating mechanism shown in Figs. 2, 3 and 4 the cradle 11 is supported for rotation on the frame by two sets of roller bearings 23. A pair of tooth angle adjusting plates 24 is mounted on the cradle, being guided for adjustment thereon about axis 12 by a center 25 which has an annular flange seating in arcuate grooves in the plates. Adjustment may be effected by a turnbuckle 26 after first loosening clamp bolts 27 and 28 whose nuts are retained in arcuate T-slots in the cradle. Graduated plates 29 indicate the angle of such adjustment from a selected zero position.

Adjustable rectilinearly along each plate 24 is a cone distance adjusting plate 30 which has a guide tongue 31 (Fig. 3) engaged in a guide groove in plate 24. This adjustment may be effected by turning a screw 32 after first loosening clamp bolts 28 and 33. Screw 32 is rotatable in plate 24 and is threaded to a nut anchored in plate 30. As shown, bolt 28 extends through a straight slot in plate 30 while the nuts for bolts 33 are retained in T-slots in plate 24. The magnitude of this rectilinear adjustment is shown by graduated plates 34.

One tool support 13 is adjustable upon each plate 30 along guide tongue 35 which engages in a complementary recess (not shown) in the tool support. Such adjustment may be made, upon first loosening clamp screws 36, by turning an adjusting screw 37 which is rotatable in the support and is threaded to a nut anchored in the plate. The magnitude of the adjustment is shown by scales 38 and the adjustment is further facilitated by a graduated dial 39 that is secured to the adjusting screw. By such adjustment the spacing of the tools, which determines the width of the tooth slot cut in the work, may be varied. Also by this adjustment the tools may be brought either into symmetrical relation relative to cradle axis 12, for cutting straight bevel gears, or into an asymmetrical relation, for cutting skew bevel gears.

Each tool 14 is carried by an arm 40 fulcrumed upon its support 13 by a pivoted link 41. The link is pivoted to the tool arm by a bolt 42 and anti-friction bearing 43, and is pivoted to a bracket 44 by a bolt 45 and an anti-friction bearing (not shown) similar to bearing 43. Bracket 44 is adjustable on support 13 about the axis 46 of a tool drive spindle 47, and for this purpose has a tongue engaging in an arcuate T-slot 48 in the support. A nut 49 threaded to a bolt whose head is anchored in the slot clamps the bracket to the support. The spindle 47 is journaled on anti-friction bearings 50 for rotation in support 13. Rotatable as a unit with the spindle is an eccentric journal 51 that is rotatable in arm 40 on anti-friction bearings 52. As shown in Figs. 3 and 4 the inner races of the bearings are secured on journal 51 by a screw and washer, and the bearings are covered by an overlying plate 53 secured to arm 40.

The above-described arrangement is such that as the spindle 47 rotates, carrying the eccentric 51 with it about axis 46, the tool 14 is moved in a substantially elliptical orbit, indicated at 54 in Fig. 4. In this action the link 41 acts as a moving fulcrum having freedom of motion in an arc which extends approximately in the direction of the minor diameter of elliptical orbit 54, and, since the tool is at a greater distance from this fulcrum than is the eccentric, the motion of the tool in the direction of the major diameter of the orbit is greater than (approximately twice) the diameter of eccentricity of journal 51.

The orbit resulting from this preferred tool drive linkage is described as "substantially" elliptical inasmuch as it is unsymmetrical with respect to both its major diameter and its minor diameter and therefore is not a true ellipse. However the exact shape of the orbit is of no particular importance, and any shape which is substantially or approximately an ellipse, i.e. which is a smooth closed curve having a major diameter substantially larger than its minor diameter, is suitable for the purpose of this invention. As shown in Fig. 4 the curvature of the portion of the orbit during which cutting occurs is relatively small, while the succeeding portion is of much greater curvature, so that after the cutting ends the tool quickly moves clear of the work. This enables the cutting of gears G having front hubs or shanks which limit the overall stroke of the tool.

The direction of the major diameter of the orbit may be varied by adjusting the bracket 44 along slot 48. This has the effect of swinging the entire linkage 44, 41, 40 about axis 46. By this adjustment the direction of motion of the tool 14, when at the center of its cutting stroke, can be caused to be perpendicular to the cradle axis or inclined at a desired angle to the perpendicular. The adjustment enables the cutting tools to represent a tooth of a generating gear which is either a crown gear or an internal or an external bevel gear. Hence it enables the cutting of skew bevel gears and bevel pinions that will mate properly with non-generated gears, and also, by employing a cradle rotation having a 1:1 ratio with the work spindle rotation, the cutting of non-generated gears. Furthermore it provides a means for changing the tooth shape slightly in order to obtain the desired tooth bearing.

The size of the orbit may be varied by adjusting the eccentricity of journal part 51 from axis 46. For this purpose the spindle 47 has a bore eccentric to axis 46 and journaling a shaft 55 that is integral with and eccentric to the journal part 51. Splined to the outer end of shaft 55 is a face toothed clutch member 56 engaged with clutch teeth on the adjacent end face of the spindle. Upon first loosening a retaining nut 57 the clutch member may be disengaged from the spindle and the shaft turned within the spindle, thereby swinging journal part 51 to the desired amount of eccentricity relative to the spindle axis.

Referring to Fig. 3, it will be seen that the relief motions of the tools, which enables them to clear the work during their non-cutting or idle strokes, are in a direction perpendicular to the spindle axes 46. Thus the relief motions of the two tools are in directions oppositely inclined to the plane of symmetry of the tools, i.e. in Fig. 3 the plane through cradle axis 12 perpendicular to the plane of the view. Thus the relief motion of each tool carries it away from the cutting path of the other tool.

Each cutting tool 14 preferably comprises a beveled disc which is notched to provide a front cutting face having suitable hook and rake angles. The intersection of this cutting face with the peripheral surface of the disc constitutes the tip cutting edge of the tool, while the intersection of the cutting face with the beveled surface 58 facing the arm 40 constitutes the tooth side-cutting edge. In the particular design shown in Fig. 4, the cutting point of the tool, i.e. the intersection of the side cutting edge and the tip cutting edge, is disposed in the common plane of the axes of pivot bolt 42 and eccentric journal 51, while the axis of the disc is somewhat offset from this plane. The cutting edge 15 is offset from the axis of the disc, to provide suitable clearance for the tool back of the edge. Accordingly in order to make this edge straight the axial-section profile of beveled surface 58 must be made slightly concave. The precise form of this concavity is a matter which can readily be determined by those skilled in this art.

Each disc tool 14 has a central cylindrical hub telescoping into a bore in the related arm 40 and an axially extending screw-threaded aperture into which is threaded a clamping screw 59. The tool is resharpened by removing it from its arm and grinding back its cutting face. When it is then replaced it must be adjusted about the axis of screw 59, preferably with the aid of a suitable gage applied to the arm, to bring the cutting point to its design position. Such adjustment is effected by rotating the disc by means of a worm 61 that is rotatable in a bore 62 in the arm, the worm meshing with a series of teeth provided on the inner face of the disc. After such adjustment the screw 59 is tightened and screw-plugs 63, which are threaded into the ends of bore 62, are screwed in to clamp the worm, thus firmly locking the disc tool against rotation about its own axis under cutting loads. As shown in Fig. 5 the plugs have wrench-socket openings extending entirely therethrough that are larger than the wrench socket within the worm 61. Accordingly it is only necessary to slightly loosen one plug in order to rotate the worm with a suitable wrench, not shown.

If the angle A, Fig. 3, between the spindle axis 46 and the cutting edge 15 is exactly a right angle, the edge will of course cut in a plane perpendicular to the axis. Accordingly tooth surfaces cut by the tool will be straight from end to end. However, according to the present invention this angle A is preferably made slightly less than a right angle (eighty-eight degrees in the particular embodiment illustrated) with the result that during its cutting stroke the edge 15 describes a slightly concave cutting surface. This causes tooth surfaces cut by the edge to be slightly crowned from end to end, thus localizing the bearing or area of contact of the teeth with those of mating teeth. This is true irrespective of whether or not the teeth are cut with generating motion, i.e. with relative rolling motion of the cradle and work about their respective axes 12 and 16.

The drive for the machine, and especially for the tools, will now be described with reference primarily to Figs. 3 and 6. The drive is from a motor 64, through shaft 65, bevel gears 66, main drive shaft 67, cutter speed change gears 68 to a shaft 69, the latter being rotatable on cradle axis 12 on anti-friction bearings 71 which are supported by sleeve 72 of the cradle assembly. Integral with shaft 69 is a drive pinion 73 for gears 74 secured on shafts 75. These shafts are journaled for rotation on bearings 76 in brackets 77 which are pivotal about axis 12 on the center 25 and sleeve 72. Each shaft 75 is splined to a sleeve 78 to which is keyed a bevel gear 79 for driving a pinion 81 secured to a shaft 82.

Each sleeve 78 is journaled for rotation on anti-friction bearings 83 in a bracket 84 which has a tubular sleeve portion rotatable in a tubular extension of the related tool support 13. As shown in Fig. 3 the plates 24 and 30 have openings through which these telescoped tubular parts extend. Thin plates 85, each having a circular aperture for passing one of the tubular extension supports 13, are slidable in shallow recesses on the front faces of plates 30 and serve to close these openings regardless of the position of adjustment of the tool supports. Each shaft 82 is mounted on anti-friction bearings 86 within the sleeve portion of its bracket 84 and has secured to its forward end a bevel pinion 87 for driving a ring gear 88 keyed to tool drive spindle 47. One of these ring gears, the lower one in Fig. 3, is keyed directly to its spindle while the other is keyed to a sleeve 89 which is secured to the spindle by a face toothed clutch member 91, whose teeth mesh with teeth on the outer end face of the sleeve.

The member 91 is keyed to the spindle and may be moved axially, to permit adjustment of the angular relation between the upper gear 88 and the related eccentric 51, upon loosening a locknut 92. The purpose of this adjustment is to enable the two eccentric journals 51 to be brought into opposed phase relation so that one tool 14 may be at the center of its cutting stroke when the other tool is at the center of its return stroke. Such adjustment is necessary because due to the gearing 73, 74 the angular adjustment of plates 24 about axis 12 has the effect of changing the angular phase relationship between the two gears 88.

The drive for the work spindle 22 is from main drive shaft 67 through change gears 93 which control the rate of the generating motions of the machine, shaft 94, bevel gears 95, shaft 96, bevel gear 97, overhead shaft 98, bevel gears 99 of which one is splined to slide upon shaft 98, telescoping shaft 100, bevel gear 101, index change gears 102 which control the angle of work spindle rotation per oscillation of the crade, shaft 103 and bevel gears 104. The drive for the cradle is from shaft 96 through bevel gears 105 and shaft 106 to cam 107. The latter acts, through an adjustable length lever 108 and a connecting rod 109 that is pivoted to both the lever and the cradle, to oscillate the cradle through a desired angle about its axis 12 once for each complete turn of shaft 106. The cam 107, lever 108 and connecting rod 109 are so arranged with respect to the cradle that angular motion of the cradle in at least one direction, while the tools 14 are cutting, is in constant or nearly constant velocity ratio to rotation of the drive train including spindle 22. If desired several different interchangeable cams 107 may be provided, each one to handle a different range of angles of cradle oscillation.

Also mounted on the shaft 106 are a feed cam 111, a helical motion cam 112 and an automatic stop cam 113. The feed cam is adapted to operate through means (not shown) for feeding the sliding base 17 inwardly, to bring the work into position for cutting, at or prior to the beginning of the cutting roll of the cradle, and to move base 17 outwardly, to withdraw the work so that it is clear of the tools 14 during the return roll of the cradle. The helical motion cam may be employed if desired to cause an infeed or an outfeed of slight magnitude of the sliding base 17 during the generating roll, for the purpose of modifying the tooth surfaces, such for example as changing the pressure angle on the opposite sides of gear teeth for correcting a condition known as "lame" tooth bearing. The mechanism operated by the helical motion cam may be of any suitable type known in the art, such as that shown in U.S. Patent No. 2,444,551, granted July 6, 1948. The cam 113 may operate a suitable mechanism (not shown) to automatically stop the motor 64 after all of the teeth of the work gear G have been cut. As is also well known in the art the cam 111 may be connected to the sliding base 17 through a hydraulic cylinder and piston assembly, in such manner that by operating a valve lever 114, Fig. 1, the base may be further withdrawn for the purpose of chucking or dechucking a work gear.

Figure 6:
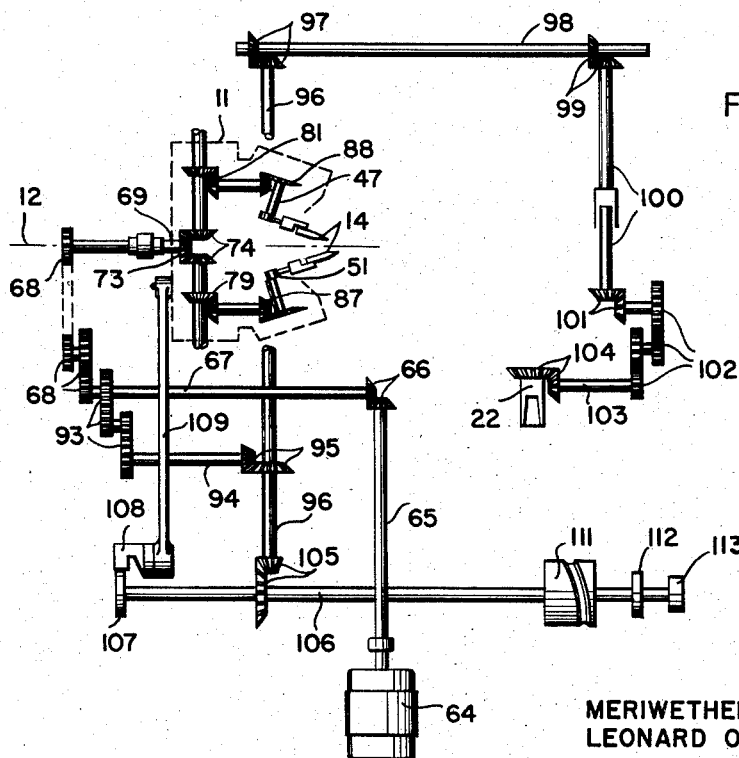
Fig. 6 is a drive diagram of the machine.

The drive train shown in Fig. 6 results in continuous indexing of the work, the work spindle 22 rotating continuously in one direction while the cradle 11 alternately turns in opposite directions. However as those skilled in the art will readily understand, the invention is equally applicable to machines of the kind employing an intermittent indexing mechanism in which the drive train reverses with the cradle and in which the work spindle is indexed relative to the drive train once during each generating cycle. It will also be understood that those aspects of the invention relating only to the tools, and the driving and supporting mechanism therefor, may be applied to machines of the form-cutting or non-generating types in which there is no relative motion between the tool support 13 and the work during the cutting of one or a pair of tooth surfaces, except, if desired, a depth feed motion.

Having now described the preferred embodiment of our invention, and its mode of operation, what we claim is:

1. A machine for cutting the tooth sides of straight bevel gears and the like with a tool which while cutting moves substantially in the direction of the root of the tooth side being cut, from end to end of such tooth side, comprising a work support and a tool support, and means on the tool support for carrying a cutting tool in a substantially elliptical orbit, with the tooth-side-cutting edge of the tool disposed approximately in the plane of said orbit, said means being so positioned on the tool support that the tool moves in the direction of the major diameter of said orbit when it is at least approximately at the mid-points of its cutting and return strokes, said orbit providing a path of tool motion that is of relatively large radius while the tool is cutting and of relatively small radius during the advance and withdrawal of the tool which respectively precedes and follows cutting.

2. A machine according to claim 1 in which the plane of said orbit is inclined at a small acute angle to the tooth side cutting edge of the tool whereby during the cutting stroke said edge describes a curved cutting surface.

3. A machine according to claim 2 in which the sense of the inclination of said cutting edge is such that the cutting surface is concave, to produce a longitudinally convex tooth surface.

4. A tooth cutting machine according to claim 1 in which there is a pair of said tool-carrying means on the tool support, and the planes of the two orbits of motion of the tools carried by said means are inclined to each other.

5. A machine according to claim 4 in which the two tool-carrying means are connected to move in opposed relation whereby one tool cuts during the return stroke of the other.

6. A machine according to claim 4 in which the line of intersection of the planes of the two orbits is at least approximately parallel to the major diameters of the orbits.

7. A machine according to claim 6 in which the inclination of the two orbits is such that the edges of the two tools cut the adjacent sides of different teeth of the work.

8. A machine according to claim 5 in which the inclination of the two orbits is such that the two tools operate in the same tooth space of the work to thereby cut the adjacent sides of adjacent teeth.

9. A machine according to claim 1 in which one of the supports is mounted on an angularly movable cradle, the work support comprises a work spindle whose axis intersects the axis of the cradle, and the work support is adjustable to vary the inclination of the cradle axis to the axis of the work spindle.

10. A machine according to claim 9 in which the cutting tool carrying means is adjustable on the tool support to vary the inclination between the cradle axis and the direction of the major diameter of the elliptical orbit of the tool.

11. A machine according to claim 9 in which the cutting tool carrying means is adjustable on the tool support in a direction to vary the amount of offset of the major diameter of said orbit from the cradle axis.

12. A machine according to claim 1 in which the cutting tool carrying means comprises an arm having a moving fulcrum to the tool support, said fulcrum being movable on the support in substantially the direction of the short diameter of said orbit, and a rotary element having an eccentric portion rotatably connected to the arm.

13. A machine according to claim 12 in which said moving fulcrum comprises a link pivotally connecting the arm to the tool support.

14. A machine according to claim 13 in which the pivotal connection of the link to the support is adjustable on the latter to vary the direction of the cutting stroke of the tool.

15. A machine according to claim 16 in which said adjustment is in an arcuate path about the axis of rotation of said rotatable member.

16. A machine according to claim 13 in which there is a means to vary the eccentricity of said eccentric portion, to thereby vary the size of the orbit of a tool on said arm.

17. A machine according to claim 16 in which said rotatable member has an eccentric bore parallel to its axis of rotation, and said eccentric portion is affixed in eccentric relation upon a part that is angularly adjustable in said bore, whereby such angular adjustment varies the eccentricity of said eccentric portion to the rotatable member.

18. A machine for cutting the teeth of straight bevel gears and the like, comprising a work support and a tool support, means mounting a pair of cutting tools for reciprocation on the tool support to both cut in the same tooth space of a work piece on the work support, said means being so arranged that each tool while cutting moves from end to end of the tooth side being cut in substantially the direction of the root of such tooth side, means for operating said tools in opposition whereby one cuts during the idle return stroke of the other, and the tool mounting and operating means including means for effecting relief motions of the tools whereby they clear the work during their return strokes, said last-mentioned means being so arranged that the relief motions of the two tools are oppositely inclined to the plane of symmetry of the tools, whereby the relief motion of each tool carries it away from the cutting path of the other tool.

19. A machine according to claim 18 in which the inclination of the relief motions to said plane of symmetry is approximately at the pressure angle of the side cutting edges of the tools.

20. In a machine for cutting the tooth sides of straight bevel gears and the like with a reciprocating tool adapted to cut on one stroke and to clear the work on the return stroke, the tool during each cutting stroke moving from end to end of the tooth side being cut, substantially in the direction of the root of such tooth side, the improvement which comprises means to effect depthwise motion of the tool during its cutting stroke, such depthwise motion being so timed with the cutting stroke that the tool moves toward and from its greatest depth respectively during approach and departure of the tool to and from approximately the center of said stroke, said means being arranged to effect said depthwise motion in a direction inclined at a small acute angle to the cutting edge whereby the latter describes a curved cutting surface.

References Cited in the file of this patent

UNITED STATES PATENTS

| | | |
|---|---|---|
| 2,211,039 | Welter | Aug. 13, 1940 |
| 2,352,689 | Carlsen | July 4, 1944 |
| 2,385,330 | Candee et al. | Sept. 25, 1945 |
| 2,433,201 | Cross | Dec. 31, 1947 |
| 2,617,177 | Montgomery | Nov. 11, 1952 |
| 2,730,019 | Christman | Jan. 10, 1956 |
| 2,794,302 | Deakin | June 4, 1957 |

FOREIGN PATENTS

| | | |
|---|---|---|
| 535,236 | Germany | Oct. 9, 1931 |